R. H. KURTH.
FLOAT VALVE.
APPLICATION FILED SEPT. 18, 1914.
1,177,191.
Patented Mar. 28, 1916.
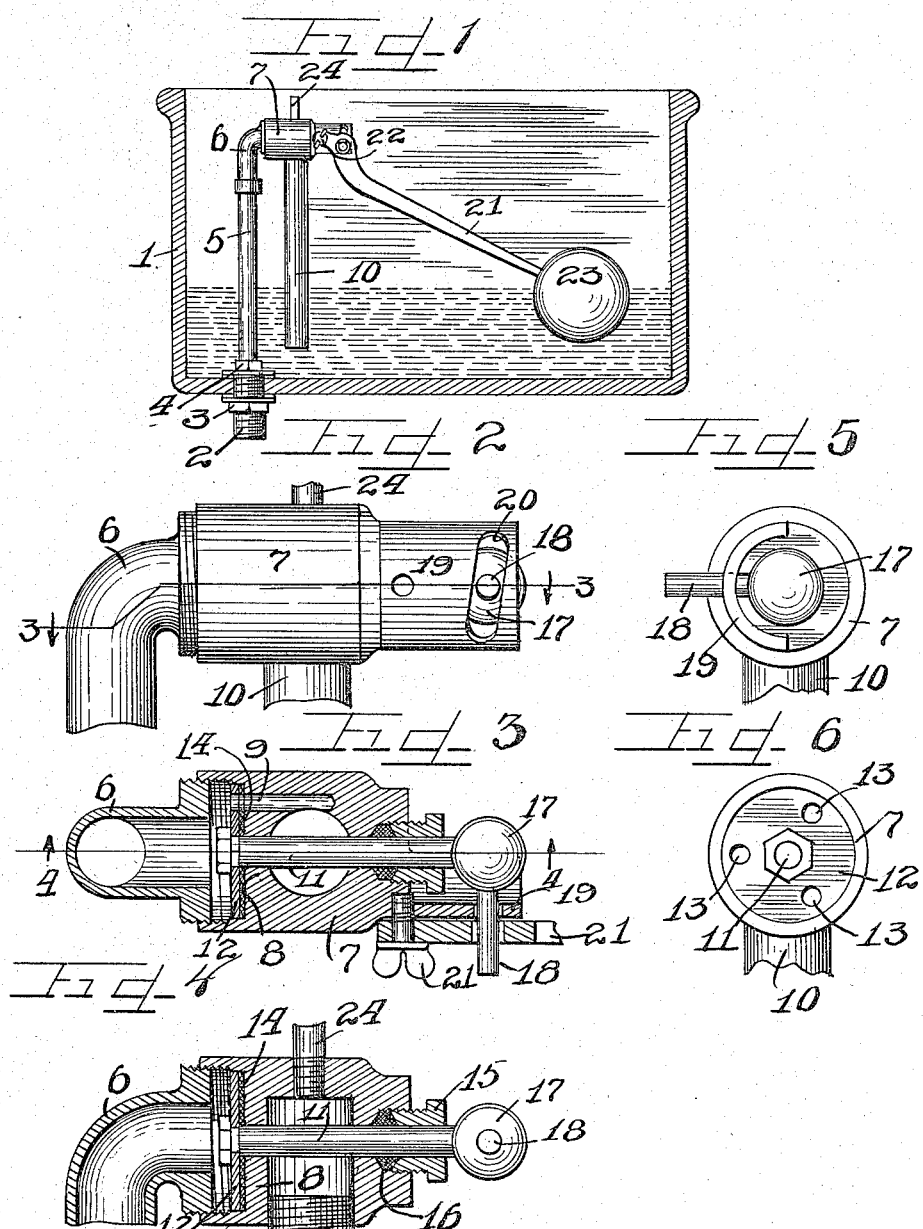
Witnesses
J. W. Angell
Charles W. Tillage jr.
Inventor
Rudolf H. Kurth
by Charles W. Tilley Atty.

UNITED STATES PATENT OFFICE.

RUDOLF H. KURTH, OF CHICAGO, ILLINOIS.

FLOAT-VALVE.

1,177,191.  Specification of Letters Patent.  Patented Mar. 28, 1916.

Application filed September 18, 1914. Serial No. 862,261.

*To all whom it may concern:*

Be it known that I, RUDOLF H. KURTH, a citizen of the United States, and a resident of the city of Chicago, in the county of Cook and State of Illinois, have invented certain new and useful Improvements in Float-Valves; and I do hereby declare that the following is a full, clear, and exact description of the same, reference being had to the accompanying drawings, and to the numerals of reference marked thereon, which form a part of this specification.

This invention relates to an improved form of float controlled valve for governing the inlet of water to a reservoir. By this invention a rotary type of gate valve is operatively connected with a float, and capable of a certain amount of longitudinal movement whereby, when the valve is in open position, the closure rests loosely upon its seat, and when in closed position, is forced tightly thereon.

It is an object of this invention to construct a valve having a closure rotatable upon a seat, said seat and closure provided with apertures adapted to register with one another when the valve is in open position, and the mechanism so constructed as to permit longitudinal displacement of the closure away from the seat when moving into open position, and toward the same, when moving into closed position to insure sealing of the apertures then out of register.

It is also an object of this invention to construct a valve, the closure of which is rotatable and apertured to open and close apertures in the valve seat, and is also movable longitudinally a slight amount, whereby mechanism guided in a cam slot acts to force said closure tightly upon the seat when the same is rotated into closed position, to insure a tight seal thereof.

It is also an important object of this invention to construct a valve provided with an apertured disk closure rotatable upon an apertured seat, and mounted at the end of a longitudinally movable stem, said stem having at its outer end means loosely engaged by a float lever and guided in a cam slot, whereby rotation of said stem causes the same to move longitudinally, acting to clamp the disk closure tightly upon the seat when the valve is in closed position.

It is finally an object of this invention to improve the construction of float controlled valves whereby in certain positions, the pressure of the closure upon the washer or seat is relieved to prevent excessive friction and wear, and permit easy opening and closing of the valves.

The invention (in a preferred form) is illustrated in the drawings and hereinafter more fully described.

In the drawings: Figure 1 is a central vertical section taken through a reservoir illustrating the same equipped with a float controlled inlet valve embodying the principles of my invention. Fig. 2 is an enlarged fragmentary side view of the device with the float and float rod detached. Fig. 3 is a section taken on line 3—3 of Fig. 2, with parts shown in elevation. Fig. 4 is a section taken on line 4—4 of Fig. 3, with parts shown in elevation. Fig. 5 is an end view of the device with the float lever and float omitted. Fig. 6 is a view of the other end thereof with the inlet pipe detached.

As shown in the drawings: The reference numeral 1, indicates as a whole a reservoir, which may be of any desired configuration, and having an inlet pipe 2, opening thereinto through an aperture in the bottom, suitably sealed by means of nuts and washers 3 and 4, respectively. An upright pipe 5, is threaded into the end of said inlet pipe 2, and at its upper end is provided with an elbow 6, upon which the valve is connected and supported. The valve consists of a barrel 7, which at one end is internally threaded and attached upon said elbow 6, with a partition wall 8, extending across the interior thereof and provided with a number of apertures 9. A downwardly directed outlet pipe 10 is threaded into the under side of said barrel 7, and is adapted to permit outlet of the fluid entering into the interior of said valve through the apertures 9, in the partition wall. A valve stem 11, extends axially through said barrel 7, and at one end is provided with a circular disk closure 12, secured thereon to rotate therewith, said disk having a number of apertures 13, adapted to register with the apertures 9, in the partition when the valve is in open position. An apertured fiber washer 14, is interposed between said valve closure 12, and the face of said partition wall 8, said washer being sprung into position or affixed to said partition in any suitable manner, of course with its apertures in register with the apertures 9, of the partition. The actuating end of said stem 11, extends rearwardly in the barrel 7, through a suitable gland 15, threaded therein, which compresses packing material 16, around said stem to prevent leakage. A ball connection 17, at the outer end of said stem 11, affords a rigid connection therebetween and a laterally directed short rod or lever 18. An integral curved or cylindrically shaped extension 19 projects rearwardly from said barrel 7, and is provided with an inclined cam slot 20, through which said rod 18, is adapted to move. For the purpose of actuating the valve, a relatively long float lever 21, is pivotally connected to said extension 19, by means of a thumb screw 22, and is provided with an enlarged aperture through which said rod 18, loosely engages, the outer end of said lever having a float 23, of spun copper or any other suitable material secured thereon. An air vent pipe 24, communicates in the upper end of said barrel 7, and acts to prevent any augmentation of pressure therein, due to rise of the level of the water in the reservoir.

The operation is as follows: When the float is in the lower position shown in Fig. 1, the weight thereof on said lever 21, acts to pull downwardly upon the rod 18, thus rotating the valve stem 11, to open the valve. Furthermore, due to the inclination of the cam slot 20, through which said rod 18, projects, the valve stem 11, is moved inwardly within said barrel 7, so that the valve closure 12, is displaced from the washer 14, and of course adjustments of said valve with the friction thus obviated, are easily made. However, when the level of the water within the reservoir 1, rises, due to the flow of water through the inlet pipe 5, and into the reservoir through the long outlet pipe 10, the valve stem 11, is rotated to move the apertures 13, of the closure 12, out of register with the apertures in the washer and valve seat. Furthermore the cam slot 20 causes the valve stem 11, to be moved outwardly, thus compressing the valve closure tightly upon the fiber washer 14, insuring an effective seal for the closed valve. The loose connection between the lever float rod 21, and said short stem or rod 18, permits the small amount of play necessary due to movement of the valve stem 11, longitudinally within said barrel. The air vent pipe 24, serves a double purpose, namely to prevent augmentation of pressure within the barrel 7, as the level of water within the reservoir rises, and also to prevent siphoning of the water from the reservoir through said pipe 5, in the event that the inlet flow of water should fail. The device operates exceedingly efficiently and very silently, owing to the fact that the outlet pipe 10, admitting the water into the reservoir, extends to near the bottom thereof.

I am aware that various details of construction may be varied through a wide range without departing from the principles of this invention, and I therefore do not purpose limiting the patent granted otherwise than necessitated by the prior art.

I claim as my invention:

1. In a device of the class described, a barrel, an apertured partition therein, a rotatable disk closure having apertures therein adapted to register with the apertures in said partition when the device is open, a stem for rotating said closure, means for rotating said stem, and cam mechanism on said barrel and stem for causing longitudinal movement of said stem during the opening and closing movements of the disk.

2. In a valve of the class described, a barrel, a seat therein having a plurality of apertures therethrough, a rotatable disk closure having apertures therein adapted to be registered with the apertures in said seat, when the valve is open, a valve stem extending axially through said barrel and secured to said closure to operate the same, an integral extension on said barrel having an inclined cam slot therein, and means secured to said valve stem and engaging in said cam slot to cause longitudinal movement of said stem and disk closure when the same are rotated.

3. In a device of the class described, a barrel, an apertured partition therein, an apertured washer secured upon said partition, a rotatable flat disk closure having apertures therein adapted to be registered with those in said washer when the device is open, a stem for rotating said closure and moving the same longitudinally toward and away from said washer during closing and opening movements of the valve, a lever for rotating said stem, and guiding means for causing said longitudinal movement of said stem.

In testimony whereof I have hereunto subscribed my name in the presence of two subscribing witnesses.

RUDOLF H. KURTH.

Witnesses:
CHARLES W. HILLS, Jr.,
FRANK K. HUDSON.

Copies of this patent may be obtained for five cents each, by addressing the "Commissioner of Patents, Washington, D. C."